United States Patent
Yoshii et al.

(10) Patent No.: US 9,053,393 B2
(45) Date of Patent: Jun. 9, 2015

(54) LEARNING METHOD AND APPARATUS FOR PATTERN RECOGNITION

(75) Inventors: Hiroto Yoshii, Tokyo (JP); Masakazu Matsugu, Yokohama (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 13/050,872

(22) Filed: Mar. 17, 2011

(65) Prior Publication Data

US 2011/0229020 A1    Sep. 22, 2011

(30) Foreign Application Priority Data

Mar. 19, 2010   (JP) .................... 2010-064756

(51) Int. Cl.
  *G06K 9/62*   (2006.01)
  *G06K 9/68*   (2006.01)

(52) U.S. Cl.
  CPC .................... *G06K 9/6282* (2013.01)

(58) Field of Classification Search
  CPC .......... G06T 7/0083; G06T 2207/20144; G06T 7/0081; G06K 9/6282; G06K 9/00288
  USPC ................................ 382/159, 226
  See application file for complete search history.

(56) References Cited

U.S. PATENT DOCUMENTS

| | | | |
|---|---|---|---|
| 5,978,497 A * | 11/1999 | Lee et al. | 382/133 |
| 6,009,199 A | 12/1999 | Ho | |
| 6,088,483 A | 7/2000 | Nakano | |
| 2008/0199044 A1* | 8/2008 | Tsurumi | 382/103 |
| 2010/0027845 A1* | 2/2010 | Kim et al. | 382/107 |
| 2010/0332210 A1* | 12/2010 | Birdwell et al. | 703/22 |
| 2011/0188715 A1* | 8/2011 | Shotton et al. | 382/128 |

FOREIGN PATENT DOCUMENTS

JP    3166905 B2    5/2001

OTHER PUBLICATIONS

Vincent Lepetit and Pascal Fua, "Keypoint Recognition Using Randomized Trees", IEEE Transactions on Pattern Analysis and Machine Intelligence (2006) pp. 1465-pp. 1479.

* cited by examiner

*Primary Examiner* — Amir Alavi
*Assistant Examiner* — Kenny Cese
(74) *Attorney, Agent, or Firm* — Canon USA Inc. IP Division

(57) ABSTRACT

A method for information processing includes a learning process to generate a tree structured dictionary based on a plurality of patterns including a target object to be recognized. The method includes selecting a plurality of points from an input pattern based on a distribution of a probability that the target object to be recognized is present in the input pattern at each node of a tree structure generated in the learning process, and classifying the input pattern into a branch based on a value of a predetermined function that corresponds to values of the input pattern at selected plurality of points.

21 Claims, 18 Drawing Sheets

LEARNING METHOD AND APPARATUS FOR PATTERN RECOGNITION

BACKGROUND OF THE INVENTION

1. Field of the Invention

The present invention relates to a pattern recognition method capable of analyzing a new pattern based on patterns learned beforehand. According to a typical example, images of a target object are captured and used as patterns for the pattern recognition. For example, the pattern recognition is employable to estimate target information (e.g., name, type, and three-dimensional position and orientation of the target object). In this case, the target object to be processed in the pattern recognition can be an arbitrary object, which is, for example, a human, an animal, an internal organ, an automotive vehicle, a camera, a printer, a semiconductor substrate, or any other object. Further, as another example, measurement values of a target physical phenomenon can be used as patterns that can be processed in the pattern recognition.

2. Description of the Related Art

The machine learning is generally known as a conventional technique capable of analyzing a new pattern based on learning patterns. Especially, classification trees and decision trees are well known as representative elements used in the pattern recognition method and widely used in many systems (see Leo Breiman, Jerome Friedman, Charles J. Stone, and R. A. Olshen, "Classification and Regression Trees", Chapman & Hall/CRC (1984) (hereinafter, referred to as Literature 1). The above-mentioned conventional method is characterized in that a pattern can be quickly analyzed with reference to a tree structure and the processing speed is superior to that of a conventional computer whose capabilities are insufficient or poor.

In the following description, regarding pattern recognition problems as being equivalent to pattern discrimination problems is meaningful. In this case, the type of each pattern to be discriminated is referred to as "class" and therefore, the technical term "class" is intentionally used in the following description.

On the other hand, the conventional classification trees and decision trees discussed in Literature 1 are disadvantageous in that the recognition performances are not so excellent.

As a conventional technique capable of solving the disadvantages of the classification trees and decision trees, a method discussed, for example, in U.S. Pat. No. 6,009,199 uses an assembly (ensemble) of classification trees. More specifically, the method discussed in U.S. Pat. No. 6,009,199 includes a process of generating a total of L classification trees, in which L is an integer equal to or greater than two and is generally in a range from 10 to 100. Then the method further includes a process of performing recognition processing using all of the generated classification trees in such a way as to realize higher performances.

The above-described assembly (ensemble) of classification trees is applicable to the computer vision as discussed in Vincent Lepetit and Pascal Fua, "Keypoint Recognition Using Randomized Trees", IEEE Transactions on Pattern Analysis and Machine Intelligence (2006) pp. 1465 to pp. 1479 (hereinafter, referred to as Literature 2). In Literature 2, a target to be processed is an image of 32 pixels*32 pixels and classification trees are successively generated based on its luminance values. More specifically, at each node of a classification tree, two points are randomly selected from an image of 32 pixels*32 pixels. Then, separation of the branch is determined based on a comparison between luminance values of the selected points. According to the description in Literature 2, the processing speed is very high and the recognition accuracy is sufficient.

However, for example, the target to be recognized may be a piece of product in a huge accumulation of products or a human in the crowd. In this case, the background is variable so greatly that the method discussed in Literature 2 cannot be directly used, because the luminance value of a portion serving as the background is greatly different from that of a target image to be learned in an unknown image. More specifically, when luminance values of two selected points are compared at each node of a classification tree, a compared luminance value may not be relevant to that of the target object. Thus, the conventional pattern recognition using classification trees may provide a result not so reliable.

On the other hand, the matching method discussed in Japanese Patent No. 3166905, which is based on correlation calculation using a mask image and applied to only a target object portion, has been conventionally used to solve problems in object recognition within background clutter scenes. However, if a large-scale problem occurs in object recognition, a conventional correlation calculation based on the matching method, which is discussed, for example, in Japanese Patent No. 3166905, cannot be employed because a very long time is required to accomplish calculation. More specifically, when the target to be recognized is a product component, the number of orientations (including rotations within the same plane) to be discriminated may rise up to 10,000 or more. In this case, the processing according to the method discussed in Japanese Patent No. 3166905 cannot be accomplished within a practical processing time.

SUMMARY OF THE INVENTION

According to an aspect of the present invention, a method for information processing includes a learning process of generating a tree structured dictionary based on a plurality of patterns including a target object to be recognized. The method according to the present invention includes selecting a plurality of points from an input pattern based on a distribution of a probability that the target object to be recognized is present in the input pattern at each node of a tree structure generated in the learning process, and classifying the input pattern into a branch based on a value of a predetermined function that corresponds to values of the input pattern at selected plurality of points.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
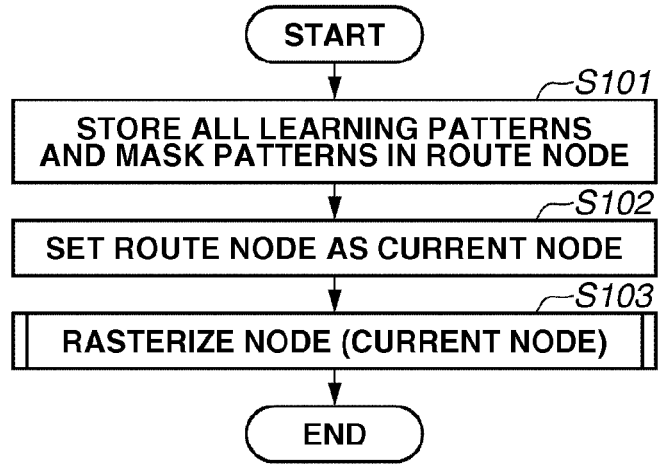
FIGS. 1A and 1B are flowcharts illustrating a learning process according to a first exemplary embodiment of the present invention.
Figure 1B:
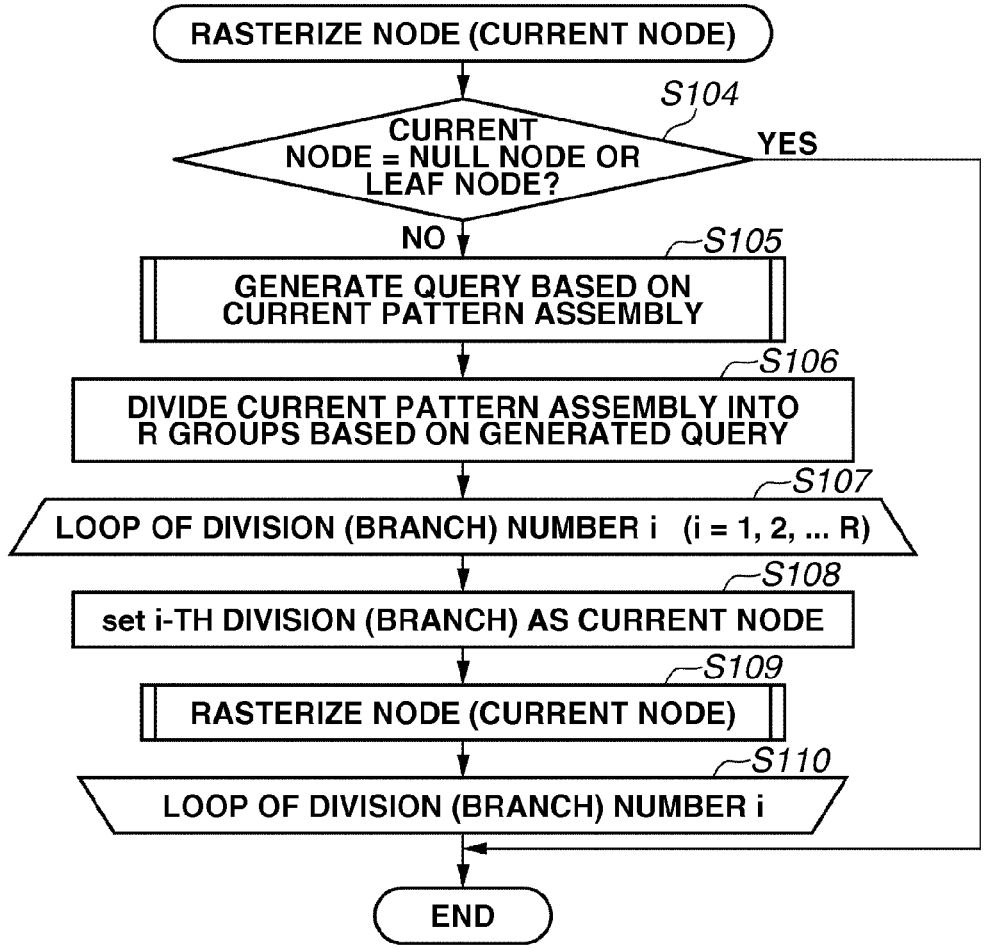

FIGS. 1A and 1B are flowcharts illustrating a basic processing procedure of an information processing method according to a first exemplary embodiment of the present invention. Prior to detailed description of the flowcharts illustrated in FIGS. 1A and 1B, a configuration of an apparatus that can realize the information processing method according to the present exemplary embodiment is described below.

Figure 2:
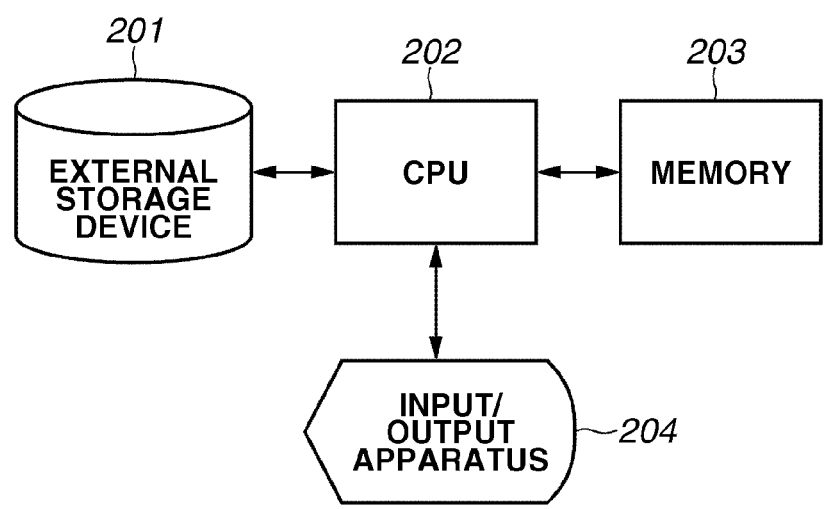
FIG. 2 illustrates a hardware configuration of a pattern recognition apparatus according to an example exemplary embodiment of the present invention.

FIG. 2 is a block diagram illustrating a hardware configuration of an information processing apparatus that can perform various operations according to the information processing method according to the following exemplary embodiments. To realize the information processing method according to the present exemplary embodiment, the information processing apparatus illustrated in FIG. 2 includes an external storage device 201, a central processing unit (CPU) 202, a memory 203, and an input/output apparatus 204. The external storage device 201 stores a program that enables the CPU 202 to execute various operations according to the present exemplary embodiment. The external storage device 201 further stores learning patterns and a dictionary generated based on the learning patterns. The external storage device 201 may store a recognition result of new patterns obtained according to the present exemplary embodiment.

The CPU 202 can execute a program loaded from the external storage device 201 to perform various controls of units in the information processing apparatus. The memory 203 can temporarily store the program that is executed by the CPU 202 and data that are processed by the CPU 202. Further, the memory 203 may store a recognition result of new patterns that can be obtained according to the present exemplary embodiment.

The input/output apparatus 204 can input new patterns and can process instructions received from a user. For example, the input/output apparatus 204 may include a camera that can capture a two-dimensional image of a target which can be used as the pattern to be processed in the information processing apparatus. Further, the input/output apparatus 204 can output a pattern recognition result to another information processing apparatus. Further, the input/output apparatus 204 enables a user to input a program execution trigger to realize the information processing method according to the present exemplary embodiment. Further, the input/output apparatus 204 can display a processing result to a user and control program parameters. Further, an output destination of the result is not limited to a human (i.e., a user) and may be, for example, a machine or an apparatus that controls a robot.

Figure 6:
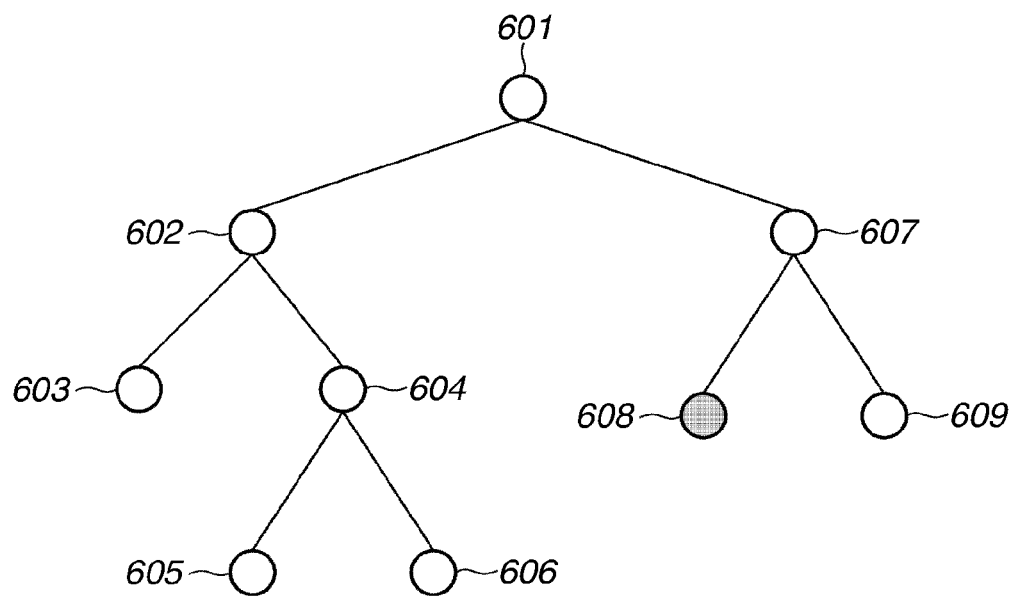
FIG. 6 illustrates an example of a completed classification tree.
Figure 7:
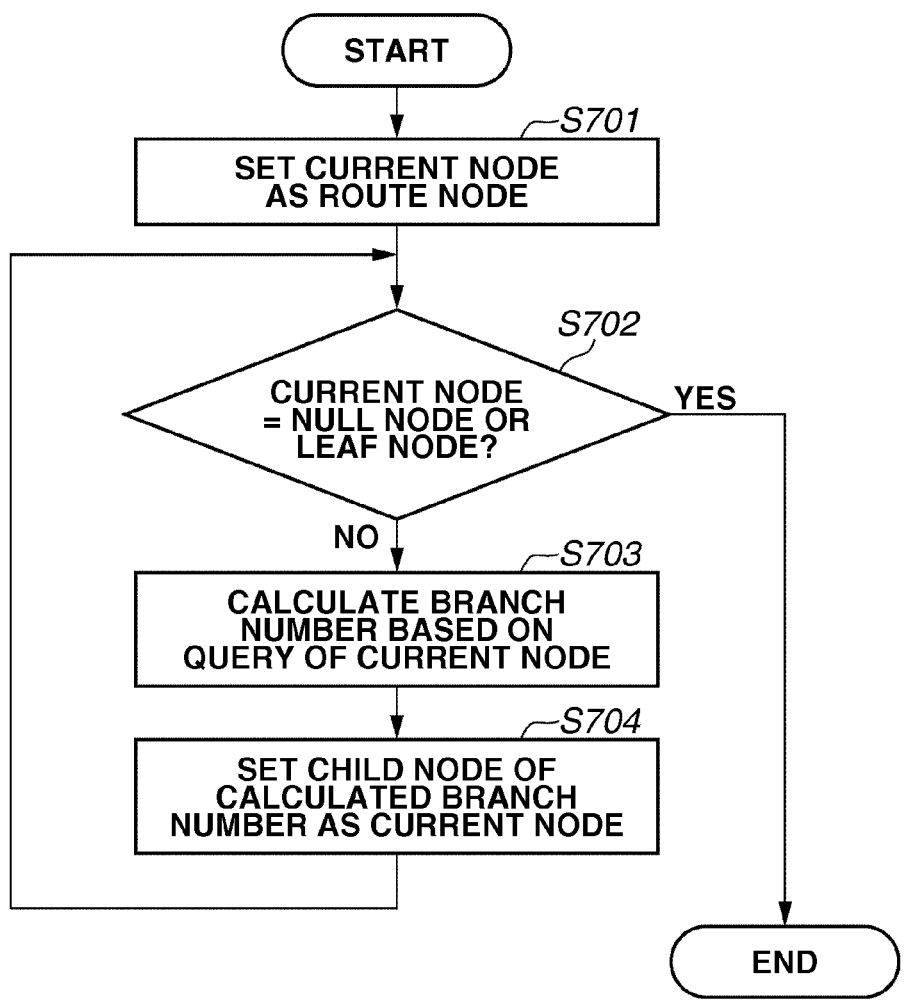
FIG. 7 is a flowchart illustrating an example recognition process according to the first exemplary embodiment of the present invention.

The pattern recognition method based on the machine learning includes two processes. The first process is a learning process for performing learning based on many patterns. The second process is a recognition process for analyzing a newly input pattern. FIGS. 1A and 1B illustrate details of the learning process that constitutes a part of the pattern recognition method. Hereinafter, the flowcharts illustrated in FIGS. 1A and 1B are described below in detail with reference to an example of a generated tree illustrated in FIG. 6. FIG. 7 illustrates details of the recognition process that constitutes a part of the pattern recognition method.

The learning process roughly includes two routines illustrated in FIG. 1A and FIG. 1B. In the present exemplary embodiment, the CPU 202 recursively calls the routine illustrated in FIG. 1B. Therefore, the CPU 202 can recursively divide an assembly of learning patterns by executing the learning processing according to the flowcharts illustrated in FIGS. 1A and 1B. As a result, the CPU 202 can obtain a tree structured dictionary (i.e., a discriminator having a tree structure) as illustrated in FIG. 6. More specifically, generating a tree structured dictionary or a tree structured discriminator is logically equivalent to recursively dividing an assembly of learning patterns.

Figure 3A:
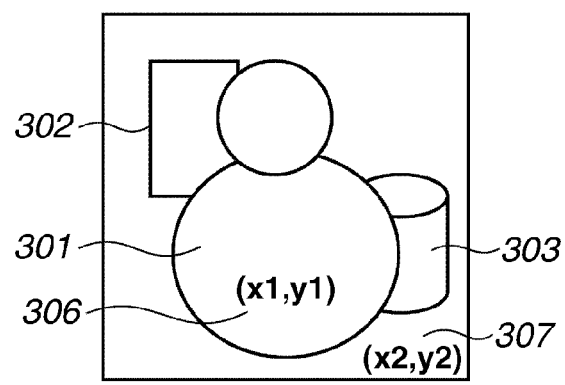
FIG. 3A illustrates an example of a learning pattern and FIG. 3B illustrates an example of a mask pattern.
Figure 3B:
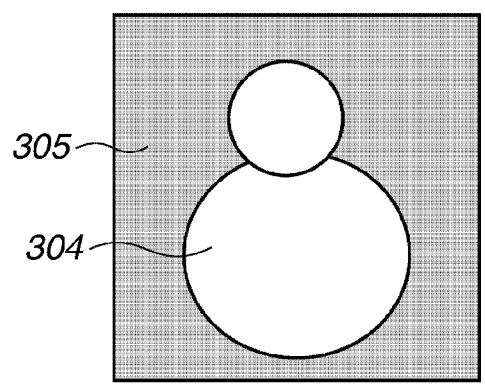

First, in step S101, the CPU 202 stores all learning patterns and mask patterns in a route node. FIG. 3A illustrates an example of the learning pattern. FIG. 3B illustrates an example of the mask pattern corresponding to the learning pattern illustrated in FIG. 3A. In the present exemplary embodiment, it is presumed that the patterns illustrated in FIGS. 3A and 3B are respectively a two-dimensional image including 1000 pixels*1000 pixels.

The learning pattern illustrated in FIG. 3A includes a target object 301 to be recognized. The target object 301 has a shape like a snowman. The learning pattern illustrated in FIG. 3A further includes two objects 302 and 303 positioned behind the target object 301. The mask pattern illustrated in FIG. 3B includes a portion 304 corresponding to an area where the target object 301 is present and a portion 305 corresponding to the rest of the image.

According to the mask pattern illustrated in FIG. 3B, as an ordinary example, a predetermined positive value (e.g., 255)

is allocated, as a pixel value, to the portion 304 serving as a "figure" and a pixel value zero (0) is allocated to the portion 305 serving as a "ground." However, the "figure" portion and the "ground" portion may not be clearly discriminable from each other. Therefore, a pixel storing an arbitrary value between 0 and 255 (=1 to 254) may be present. Alternatively, the mask pattern may have an expanded size greater than the target object. Further, a floating point can be used as a pixel value of the mask pattern.

Further, the example patterns illustrated in FIGS. 3A and 3B are two-dimensional images. In general, an N-dimensional feature vector can be used as a pattern. In the context of the present description, the technical term "dimension" corresponds to each pixel of the above-described images. In this respect, an image including 1000 pixels*1000 pixels can be regarded as a 1,000,000-dimensional pattern. Further, in a case where a general feature vector is used as a pattern, the dimension serving as the "ground" can be, for example, a so-called defective feature dimension whose value is not known.

Although the examples illustrated in FIGS. 3A and 3B are a set of a learning pattern and a mask pattern, the CPU 202 processes two or more combinations of learning patterns and mask patterns in the learning process. In the present exemplary embodiment, the learning processing that can be performed by the CPU 202 is referred to as "supervised learning" in which a class (pattern type) name is allocated to each set of a learning pattern and a mask pattern.

Next, in step S102, the CPU 202 sets the route node as a current node. In the present exemplary embodiment, the route node is a node serving as the root of a tree. According to the example illustrated in FIG. 6, a node 601 is the root of a tree. The current node is a node that the CPU 202 is presently processing in the learning process or in the recognition process. In step S103, the CPU 202 calls a subroutine illustrated for expanding the current node in FIG. 1B. When the processing returns from the subroutine illustrated in FIG. 1B, the CPU 202 terminates the learning process illustrated in FIG. 1A. In the above-described processing, the CPU 202 successively designates, as the current node, all nodes 601 to 609 illustrated in FIG. 6 in this order.

FIG. 1B is a flowchart illustrating the node expanding subroutine. First, in step S104, the CPU 202 determines whether the current node is a null node or a leaf node. If it is determined that the current node is a null node or a leaf node (YES in step S104), the CPU 202 terminates the processing of the subroutine illustrated in FIG. 1B.

In the present exemplary embodiment, if the current node does not include any learning pattern, the CPU 202 identifies the current node as a null node. Further, if the assembly of learning patterns remaining in the current node satisfies a predetermined condition, the CPU 202 identifies the current node as a leaf node. The predetermined condition to be satisfied is, for example, "the number of classes that are present in the current node is equal to or less than K (e.g., K=10)." For example, in a case where the set number K is 1 (i.e., K=1), the above-described condition can be interpreted as meaning that "the current node includes only one class." Alternatively, the CPU 202 can calculate the amount of information (or entropy) based on the learning patterns remaining in the current node. Then, the CPU 202 can determine whether the calculated value is equal to or less than a predetermined threshold. More specifically, if the threshold is set to be zero (0), the condition to be satisfied becomes equivalent to the above-described condition that "the current node includes only one class."

According to the example illustrated in FIG. 6, the CPU 202 identifies the nodes 603, 605, 606, and 609 as the leaf node, respectively, and identifies the node 608 as the null node. Referring back to the flowchart illustrated in FIG. 1B, if the current node includes any one of the nodes 603, 605, 606, 608, and 609, the determination result in step S104 becomes YES and the CPU 202 terminates the processing of the subroutine illustrated in FIG. 1B. The above-described null and leaf nodes can be respectively referred to as a terminal node. The terminal node stores information relating to the learning pattern remained therein.

For example, if a purpose of the pattern recognition is class determination, the terminal node stores a presence probability of each class. Further, if the above-described condition "the current node includes only one class" is used to define the leaf node, the terminal node can store information indicating a class number of the remaining class. On the other hand, if a purpose of the pattern recognition is regression, the terminal node stores a predetermined estimation value or an estimation vector.

If the determination result in step S104 is NO, the CPU 202 continuously performs the learning processing of the subroutine illustrated in FIG. 1B. Namely, the CPU 202 performs processing for expanding the current node in steps S105 to S110. In the sequential processing, specifically in step S109, the CPU 202 recursively calls the subroutine illustrated in FIG. 1B. As a result of the above-described processing, the CPU 202 can recursively divide the assembly of the learning patterns.

In step S105, prior to the current node expanding processing, the CPU 202 generates a query to be executed in the current node. More specifically, the CPU 202 generates a query to be executed in the current node referring to the assembly of the learning patterns (i.e., an assembly of current patterns) remaining in the current node. The query generation processing that the CPU 202 can perform in step S105 is described below in detail (i.e., as a subroutine) with reference to a flowchart illustrated in FIG. 4. In the present exemplary embodiment, the technical term "query" means an inquiry for determining which branch a target pattern belongs to. For example, the query can be described using "if statement" or "switch statement" if the language to be used by the CPU 202 is the C language.

In step S106, the CPU 202 divides the assembly of the learning patterns remaining in the current node into R groups based on the generated query. In general, the number (R) of the divided groups may be variable depending on each current node. However, in the present exemplary embodiment, the division number (R) is set to be the same value for all nodes. In the following description, the "division" may be referred to as a "branch." In particular, when the division number (R) is equal to two (i.e., R=2), the CPU 202 divides the learning pattern assembly into two groups. As a result, the CPU 202 can generate a classification tree illustrated in FIG. 6, which is generally referred to as a binary tree.

For example, in step S105 the CPU 202 generates, as a query, a luminance value comparison between two points 306 and 307 illustrated in FIG. 3A. Then, in step S106, the CPU 202 divides the learning pattern assembly based on the generated query. More specifically, if a luminance value at a coordinate point (x1, y1) is greater than a luminance value at a coordinate point (x2, y2), the CPU 202 classifies the learning pattern into the left node (branch) and otherwise into the right node (branch).

If the current node includes the learning pattern illustrated in FIG. 3A, the CPU 202 classifies the learning pattern into the left node or the right node according to the query. To generate a classification tree, a conventional algorithm includes processing for comparing a luminance value of the point 306 with a luminance value of the portion 307, regardless of whether the point is in the "figure" or the "ground," and determining a branch direction of the learning pattern between the left and right nodes. In contrast, a classification tree generation method according to the present exemplary embodiment controls the branch direction of the learning pattern using the mask pattern illustrated in FIG. 3B.

More specifically, in the learning pattern illustrated in FIG. 3A, the point 306 is involved in the portion 304 that serves as the "figure." Therefore, the CPU 202 directly uses luminance data of the point 306 in FIG. 3A. On the other hand, the point 307 is involved in the "ground" portion. Therefore, the CPU 202 does not directly use the luminance data of the point 307. Instead, the CPU 202 replaces the luminance value of the point 307 by a predetermined constant value (e.g., 0).

Alternatively, the CPU 202 can generate a random variable, as a luminance value of the "ground" portion, based on a uniform distribution in a predetermined range (e.g., 0 to 255). The CPU 202 can replace the luminance value of the point 307 by the generated random variable or any other continuously variable value. Moreover, the CPU 202 can generate a random variable based on a luminance distribution in the "figure" portion, specifically, a luminance distribution in the area 304 illustrated in FIG. 3 and uses the generated random variable.

Further, the CPU 202 can tally up luminance distributions of the "figure" portion for all learning patterns in advance, generate a random variable based on the obtained luminance distribution, and replace the luminance value of the "figure" portion by the generated random variable. As an example, in a case where the target to be recognized is an illustration drawn in lines, the pixel value is limited to either black (luminance=0) or white (luminance=255). If it is presumed that the percentage of the black line in the "figure" portion is 10% in all learning patterns. In this case, the CPU 202 can use a random variable that takes a value 0 at a probability level of 1/10 and a value 255 at a probability level of 9/10 to express the luminance value of the "ground" portion.

The above-described query is a comparison between luminance values of two points. However, the CPU 202 can determine the branching by checking if a luminance difference between two points is equal to or greater than a predetermined value. Further, the CPU 202 can determine the branching by checking if the luminance value of one point is equal to or less than "the luminance value of the other point+a predetermined value." Alternatively, the CPU 202 can select n points (n is equal to or greater than 3) and determine the branching by checking if a sum of luminance values of the selected n points is equal to or greater than a predetermined value. In general, the CPU 202 selects a plurality of points and calculates a value of a function which uses luminance values (vectors) of the selected plurality of points as inputs. Then, the CPU 202 can determine the branching by checking if the calculated value of the function is equal to or greater than a predetermined value. Further, other than luminance values, the CPU 202 can compare n-dimensional values included in a feature amount (vector) which is obtained by performing conversion processing on an input image.

The CPU 202 performs loop processing in steps S107 to S110 for each division. In step S108, the CPU 202 sets an i-th division as the current node. In step S109, the CPU 202 recursively calls the subroutine illustrated in FIG. 1B.

Next, the query generation subroutine (i.e., the processing to be performed in step S105) is described below in detail with reference to FIG. 4 and FIGS. 5A to 5D.

First, in step S401, the CPU 202 adds or integrates the mask patterns that are present in the current node. Then, in step S402, the CPU 202 converts the added or integrated result of the mask patterns into a probability density function. More specifically, the CPU 202 normalizes a distribution function in such a manner that an integrated value obtained from all sections becomes 1. Then, in step S403, the CPU 202 generates a random variable based on the obtained probability density function. The CPU 202 uses the random variable obtained in step S403 as a point to be referred to in generating the query.

The following formulae are employable when the number of the learning patterns remaining in the current node is Z. In the following formulae, a vector $M^i=(M^i_1, M^i_2, \ldots M^i_n)$ represents a mask pattern for the i-th ($1 \leq i \leq Z$) learning pattern.

In this case, a vector A represents an addition of the mask patterns as defined using the following formula.

$$A = \left( \sum_{i=1}^{Z} M^i_1, \sum_{i=1}^{Z} M^i_2, \ldots, \sum_{i=1}^{Z} M^i_n \right) \quad \text{[Math. 1]}$$

Further, a vector B represents an integration of the mask patterns as defined using the following formula.

$$B = \left( \prod_{i=1}^{Z} M^i_1, \prod_{i=1}^{Z} M^i_2, \ldots, \prod_{i=1}^{Z} M^i_n \right) \quad \text{[Math. 2]}$$

The normalization is performed as the conversion in the following manner.

$$(A_1, A_2, \ldots, A_n) \to \frac{1}{\sum_{i=1}^{n} A_i} (A_1, A_2, \ldots, A_n) \quad \text{[Math. 3]}$$

If the above-described integration calculation is employed, it is feasible to select a dimension that goes through the "figure" portions of all learning patterns that are present in the current node. On the other hand, in the above-described integration calculation, the number of dimensions having a value other than zero becomes smaller compared to the addition calculation. Selection of the addition calculation or the integration calculation can be arbitrarily determined. However, if the integration calculation is selected, it is necessary to pay attention that all values may happen to become zero.

Further, it is useful to sharpen the probability density function by further performing n-th power or exponentiation calculation after completing the addition or integration calculation. In general, performing a conversion function is effective to qualify the shape of the function after completing the addition or integration calculation.

The processing to be performed in step S401 is described below in detail with reference to FIGS. 5A to 5D. In respective graphs illustrated in FIGS. 5A to 5D, the abscissa axis represents the dimension (e.g., the position on a mask pattern in the Raster scan) and the ordinate axis represents the value of the mask pattern. The dimension on the abscissa axis is the dimension of a feature vector. For example, according to the example illustrated in FIG. 3, the total number of dimensions is 1,000,000 (=1000*1000). However, to simplify the following description, FIGS. 5A to 5D illustrate only seven dimensions. The total number of dimensions is not relevant to the query generation step in the present exemplary embodiment.

In the following description, it is presumed that two learning patterns remain in the node. For example, the node 604 illustrated in FIG. 6 corresponds to the above-described situation. On the other hand, the route node stores all learning patterns. In general, the total number of the learning patterns remaining in each node is n. In the following description, if there is a description indicating "two" learning patterns and mask patterns, it can be interpreted that the corresponding number of the learning patterns and the mask patterns is "n" in the general node.

Figure 5A:
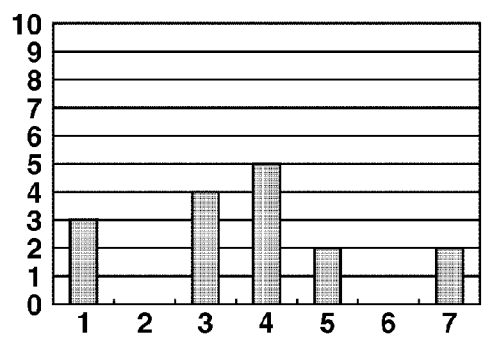
FIGS. 5A to 5D illustrate example addition and integration of mask patterns.
Figure 5B:
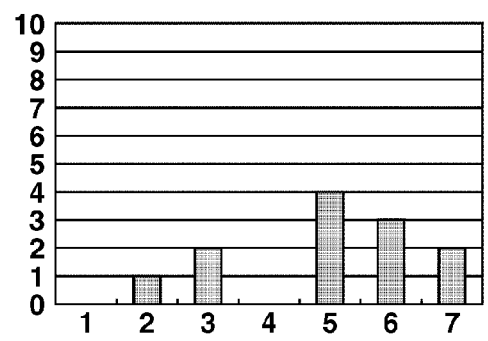

FIGS. 5A and 5B are graphs illustrating mask patterns corresponding to two learning patterns remaining in the node, respectively. The presence probability of the "figure" used in FIGS. 5A and 5B is any one of five levels 1 to 5. As understood from FIG. 5A, presence probabilities of the second dimension and the sixth dimension are zero. In FIG. 5B, presence probabilities of the first dimension and the fourth dimension are zero. Thus, it is understood that the second dimension and the sixth dimension illustrated in FIG. 5A correspond to "ground" portions. The first dimension and the fourth dimension illustrated in FIG. 5B also correspond to "ground" portions. The remaining dimensions correspond to "figure" portions.

Figure 5C:
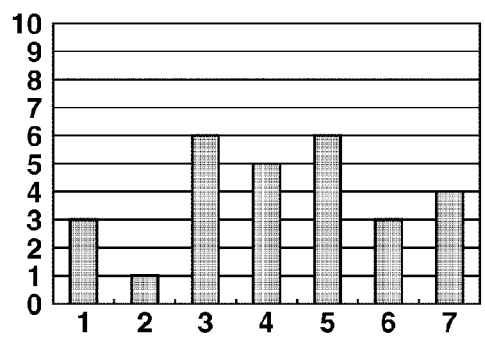
Figure 5D:
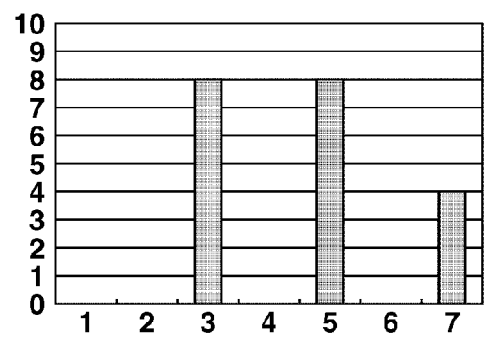

FIG. 5C illustrates an added result of two mask patterns in respective dimensions. FIG. 5D illustrates an integrated result of two mask patterns in respective dimensions. In step S402, the CPU 202 normalizes the function illustrated in FIG. 5C or the function illustrated in FIG. 5D. In step S403, the CPU 202 generates a random variable based on the normalized function (i.e., the probability density function). As a result, the obtained random variable has a dimensional value.

Figure 4:
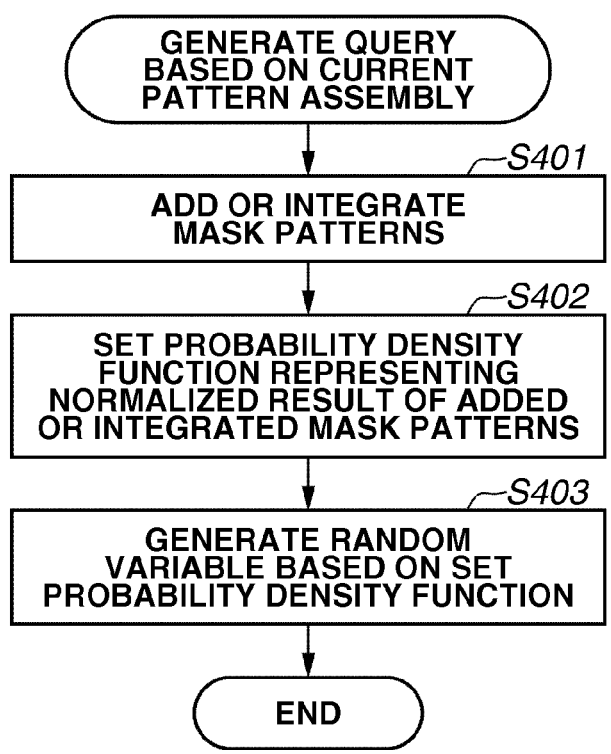
FIG. 4 is a flowchart illustrating a query generation step according to the first exemplary embodiment of the present invention.

When the images illustrated in FIGS. 3A and 3B are the patterns to be processed, the CPU 202 performs query point determination processing according to the flowchart illustrated in FIG. 4. More specifically, the CPU 202 determines a "point (pixel) to be referred to." Then, the CPU 202 can select the query point from the "figure" portion. As described above with reference to FIGS. 3A and 3B, to select two query points from the "figure" at a higher probability, the CPU 202 may generate the random variable two times.

In the above-described method, the CPU 202 randomly selects the query point. Alternatively, if the CPU 202 can evaluate some query efficiency and select a specific query point where the query efficiency is maximized. In the context of the present description, the technical term "query efficiency" represents the efficiency in terms of some criteria to be referred to in the division of the learning pattern assembly based on the query. For example, the total number of the patterns can be employed as the criterion. In this case, if the learning pattern assembly existing in a concerned node includes 100 elements, the query efficiency in the division of the assembly into two branches can be maximized if the learning pattern assembly is divided into two groups each including 50 elements. On the other hand, the query efficiency is minimized if the learning pattern assembly is divided into a group including no element and another group including 100 elements.

It may be difficult to identify the most efficient query point among all possible query candidates. In this case, the CPU 202 may repeat the step of randomly selecting the query point described with reference to FIG. 4 and FIGS. 5A to 5D several times (e.g., 1,000 times) and select the most efficient query point. Further, the amount of information (or entropy) or Gini coefficient discussed in Literature 1 can be employed as the criterion capable of indicating the query efficiency described in the present exemplary embodiment.

In the method described with reference to FIG. 4 and FIGS. 5A to 5D, the CPU 202 unconditionally uses all of the mask patterns stored in each node. Alternatively, it may be useful to allocate a weighting factor to each mask pattern with reference to its class. For example, it may be useful to use only the mask patterns corresponding to a specific class smallest or largest in the number of the learning patterns stored in the node.

FIG. 7 is a flowchart illustrating an example process of detecting a new non-learning pattern based on a tree structured dictionary generated according to the flowcharts illustrated in FIGS. 1A and 1B.

First, in step S701, the CPU 202 sets the current node as the route node. Next, in step S702, the CPU 202 determines whether the current node is a terminal node (e.g., a null node or a leaf node). If it is determined that the current node is the terminal node (YES in step S702), the CPU 202 generates a recognition result including information relating to the terminal node and terminates the subroutine illustrated in FIG. 7.

If it is determined that the current node is not the terminal node (NO in step S702), then in step S703, the CPU 202 calculates a branch number based on the query stored in the current node. Then, in step S704, the CPU 202 sets a child node identified by the calculated branch number as the current node. Subsequently, the processing returns to the step S702 in which the CPU 202 determines whether the current node is the terminal node.

The CPU 202 repetitively performs the processing according to the flowchart illustrated in FIG. 7, until the processing target (i.e., the current node) reaches a null node or a leaf node of the tree.

A characteristic feature of the present exemplary embodiment is that the mask pattern has an important role in the learning process while the mask pattern is not required in the recognition process. The step requiring mask pattern information is limited to the step of generating the query of each node in the learning process (i.e., step S105). The mask pattern information is not used in the recognition process. In this respect, the present exemplary embodiment is totally different from the conventional template matching method which uses a mask pattern discussed in Japanese Patent No. 3166905.

Figure 8:
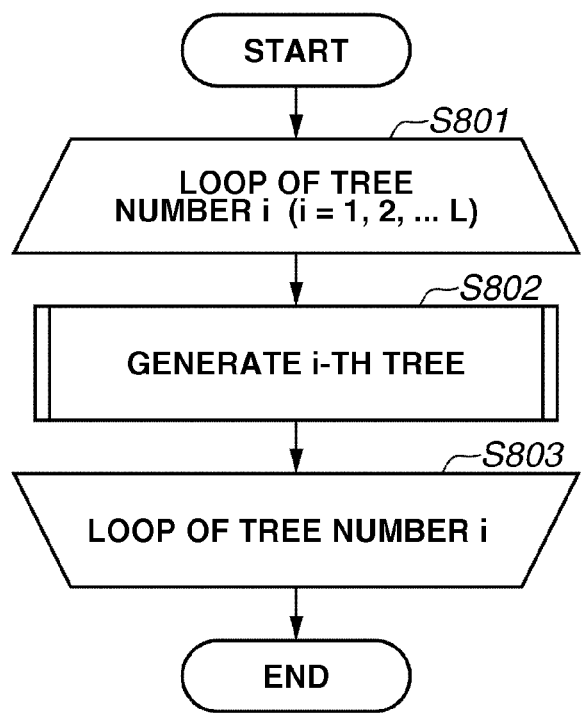
FIG. 8 is a flowchart illustrating learning processing according to a second exemplary embodiment of the present invention.
Figure 9:
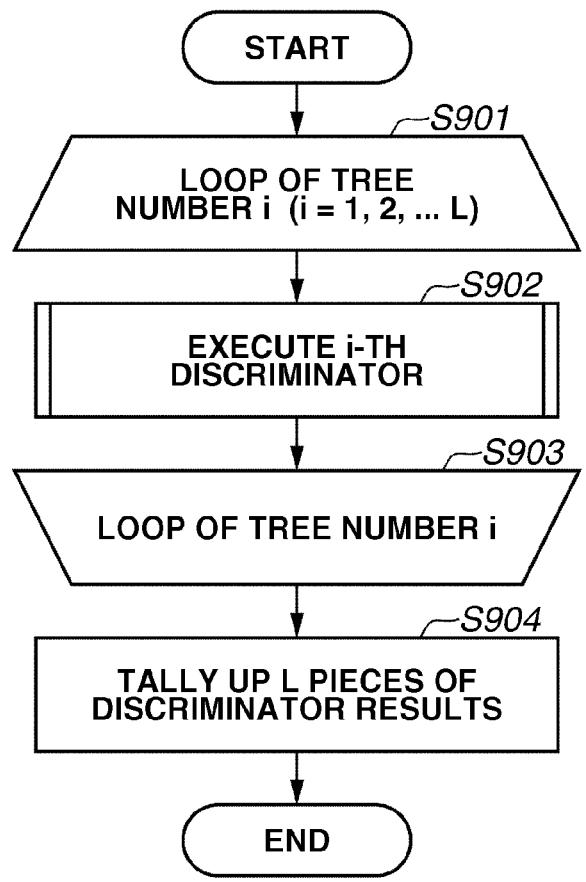
FIG. 9 is a flowchart illustrating an example recognition process according to the second exemplary embodiment of the present invention.

A second exemplary embodiment of the present invention is described below with reference to FIG. 8 and FIG. 9. FIG. 8 is a flowchart illustrating a learning process according to the second exemplary embodiment. FIG. 9 is a flowchart illustrating a recognition process according to the second exemplary embodiment.

In the first exemplary embodiment, the method for generating only one tree structured discriminator and the method for analyzing a pattern using only one tree structured discriminator are described. On the other hand, methods described in the second exemplary embodiment are a method for generating a plurality of tree structured discriminators and a method for analyzing a pattern using the plurality of tree structured discriminators.

When the total number of tree structured discriminators is L, L can be an arbitrary integer which is greater than one and an ordinary value of L is in a range from 10 to 100. If the total number L is larger, a dictionary size becomes larger although the recognition rate can be improved. On the other hand, if the total number L is smaller, the dictionary becomes compact although the recognition rate decreases.

The CPU 202 performs the learning process as loop processing (including steps S801 to S803) until the tree number increases from 1 to L. In step S802, the CPU 202 calls the learning process illustrated in FIG. 1 as a subroutine in the loop processing. The calling of the subroutine to be performed in step S802 of the loop processing is independently performed. More specifically, the loop processing to be performed in steps S801 to S803 can be simply performed as a multi-thread or multi-task. Further, it is easy to execute the loop processing using a plurality of computers. The method for generating a plurality of (L) tree structured discriminators illustrated in FIG. 8 is suitable for parallel computation. Therefore, the computation processing can be quickly accomplished by increasing the degree of parallelism.

Next, the recognition process is described below with reference to the flowchart illustrated in FIG. 9. The recognition process includes loop processing (including steps S901 to S903) until the discriminator (tree) number increases from 1 to L. The recognition process further includes a step of tallying up L pieces of discriminator results finally obtained (step S904). In the loop processing (step S902), the CPU 202 calls the recognition process using the tree structure illustrated in FIG. 7 as a subroutine.

In step S904, the CPU 202 tallies up L pieces of discriminator results and obtains a final pattern recognition result. An appropriate tallying method is employable. For example, if the pattern recognition task is a class determination task, the discriminator result of FIG. 7 can be obtained as a vector indicating a presence probability of each class. In this case, the tallying result obtained in step S904 is, for example, an arithmetic mean or a geometric mean obtainable from a total of L presence probability vectors.

Similar to the learning process illustrated in FIG. 8, the recognition process illustrated in FIG. 9 is suitable for parallel computation. Therefore, the computation processing can be quickly accomplished by increasing the degree of parallelism.

A third exemplary embodiment is characterized in that an image is handled as a pattern. Example processing according to the third exemplary embodiment is described below with reference to schematic views illustrated in FIGS. 10A and 10B.

In the third exemplary embodiment, the CPU 202 extracts M partial images from one sheet of a learning image. The extracted partial images are collectively referred to as a partial image assembly. The partial image assembly may include a plurality of partial images that are not overlapped with each other. However, it is desired to extract the M partial images thoroughly from the original learning image in such a manner that the extracted partial images are overlapped with each other.

For example, if the size of a learning image is 100*100 pixels and the size of each partial image is 50*50 pixels, the total number of partial images extractable from a single learning image is 2601 (=51*51) when an intermediate position between two pixels (i.e., a sub pixel) is not taken into consideration. If partial images are extracted so as not to be overlapped with each other, a total of 4 (=2*2) partial images can be obtained. It is desired that many of the above-described extractable partial images (i.e., 2601 partial images) are included in the partial image assembly illustrated in FIG. 10A. The finally obtained partial learning image group includes a total of M*N partial learning images in which each group including M partial learning images belongs to the same class.

The CPU 202 can extract partial learning mask patterns from a learning mask image using a method similar to the above-described method for extracting partial learning images from a learning image. More specifically, the partial learning mask pattern is a pattern (i.e., an image) having a pixel value of 1 in a portion in which a target object is present and having a pixel value of 0 in the remaining portion in the extracted partial learning image. It can be regarded that each of N registered image (learning image) sheets illustrated in FIG. 10A includes the learning image (learning pattern) and the mask pattern illustrated in FIG. 3.

Figure 10A:
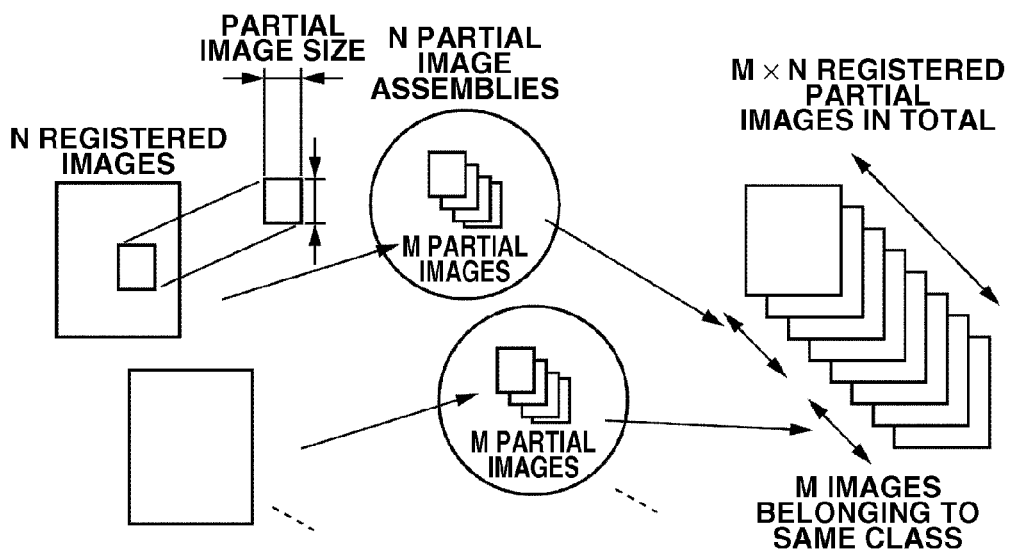
FIGS. 10A and 10B schematically illustrate an image recognition method according to a third exemplary embodiment of the present invention.
Figure 10B:
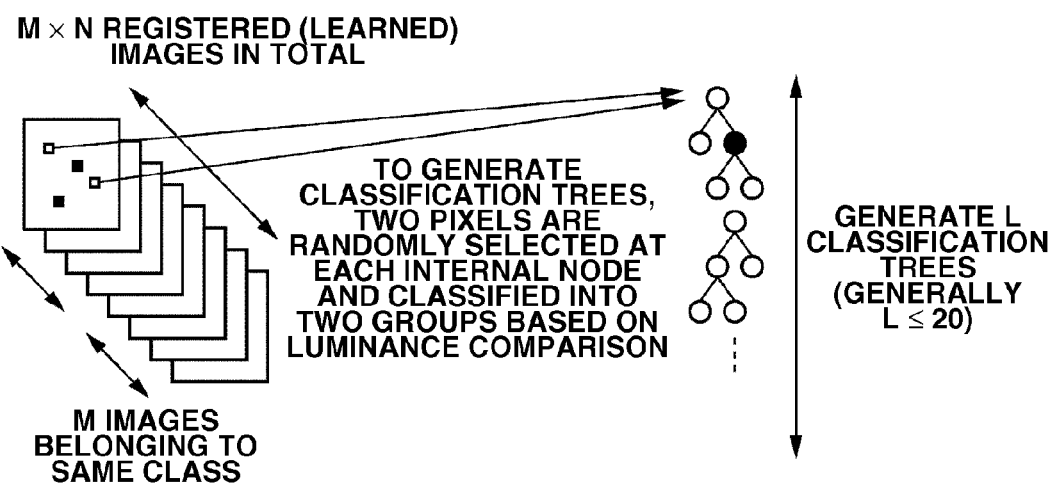

Then, the CPU 202 successively generates binary trees based on the partial learning image group and the partial learning mask pattern group (see FIG. 10B). As the total number of the classification trees is L, the CPU 202 performs the above-described classification tree generation processing L times (usually, L is equal to or less than 20). In the classification tree generation processing, the CPU 202 selects, for example, two pixels at each classification tree node. Then, the CPU 202 recursively divides the partial learning image assembly based on a comparison between luminance values of the selected pixels.

The CPU 202 can execute the query generation processing using a method similar to the method described with reference to FIG. 4 and FIGS. 5A to 5D.

Figure 11:
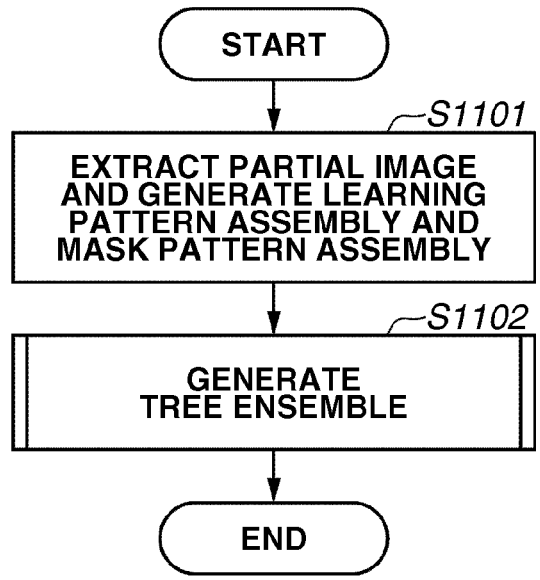
FIG. 11 is a flowchart illustrating an example learning process of the image recognition method according to the third exemplary embodiment of the present invention.

FIG. 11 is a flowchart illustrating an example learning process according to the present exemplary embodiment. In step S1101, the CPU 202 extracts partial images and generates a learning pattern assembly. The processing to be performed in step S1101 corresponds to the processing described with reference to FIG. 10A. Subsequently, in step S1102, the CPU 202 performs tree ensemble generation processing, which corresponds to the processing described with reference to FIG. 10B. More specifically, the CPU 202 calls the flowchart illustrated in FIG. 8 as a subroutine.

According to the schematic view illustrated in FIG. 10A, if the M partial images extracted from one learning (registered) image sheet are presumed to be similar in type, it can be regarded that the CPU 202 processes a total of N classes in the learning process. On the other hand, if each of the M partial images is discriminable based on the position of each partial image in the learning image, it can be regarded that the CPU 202 processes a total of M*N (types of) classes in the learning process.

Figure 12:
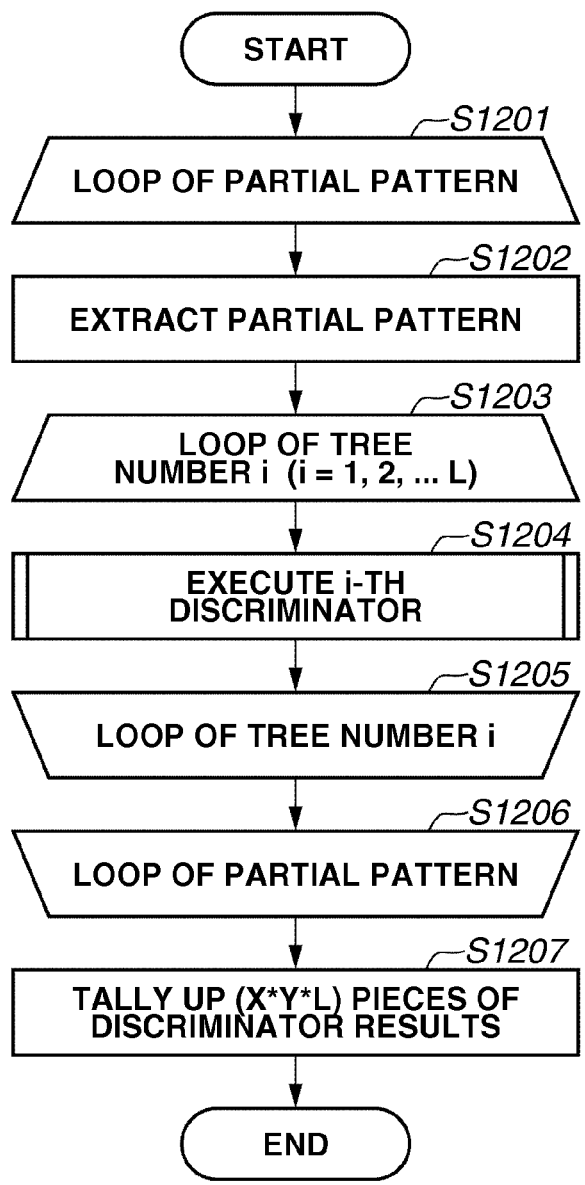
FIG. 12 is a flowchart illustrating an example recognition process of the image recognition method according to the third exemplary embodiment of the present invention.

Next, an example recognition process according to the present exemplary embodiment is described below with reference to a flowchart illustrated in FIG. 12. As an example, if the size of a newly input image is 1280*1024 and the size of each partial image is 50*50, the total number of partial images extractable from the newly input image is 1,200,225 (=1,231*975), more specifically X=1280−50+1 and Y=1024−50+1, when the sub pixels is not taken into consideration. Basically, the number of the extractable partial images is equal to the repetition number of the loop processing (i.e., steps S1201 to S1206). However, it is not always required to repeat the above-described loop processing 1,200,225 times. The repetition number of the loop processing can be reduced to speedily accomplish the loop processing.

In the partial image loop, the CPU 202 executes loop processing of steps S1203 to S1205 according to the tree number. More specifically, the CPU 202 executes double loop processing. The double loop processing according to the present exemplary embodiment can be performed independently. Therefore, the inner-outer relationship between two loop processing can be arbitrarily changed. At the deepest position of the loop, the CPU 202 executes an i-th discriminator of step S1204. To this end, the CPU 202 calls the flowchart illustrated in FIG. 9 as a subroutine.

Finally, in step S1207, the CPU 202 performs processing for tallying up (X*Y*L) determination results and obtains a final recognition result. As a result, the CPU 202 can detect the learning images each having the above-described size of 100*100 from the input image having the above-described size of 1280*1024. As an example tallying method, the CPU 202 can perform calculation processing to obtain an arithmetic mean or a geometric mean of the presence probability vector for respective classes. Further, it is feasible to obtain a presence position of a learning image, by vote, using an offset that records the position of the above-described partial image in the learning image.

Next, a fourth exemplary embodiment is described below as a modified embodiment of the third exemplary embodiment.

Figure 13:
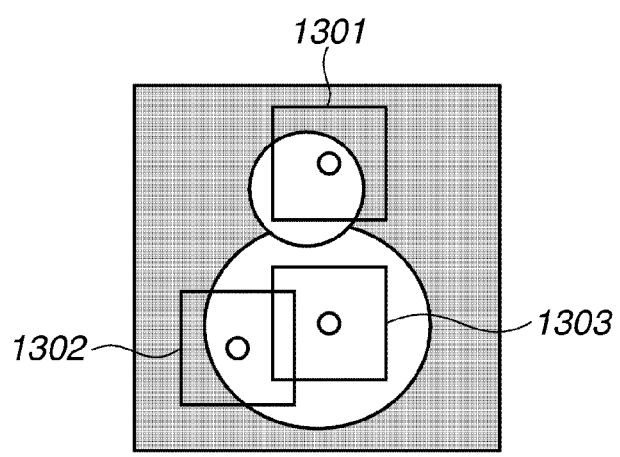
FIG. 13 illustrates a method for selecting a learning sample according to a fourth exemplary embodiment of the present invention.

The partial image selection (see FIG. 10A) according to the fourth exemplary embodiment is described below with reference to FIG. 13. An area illustrated in FIG. 13 is similar to the area where the target object is present illustrated in FIG. 3B. In FIG. 13, a portion indicated by a circle indicates the central position of a selected partial image. A square region surrounding the central circle is a portion corresponding to the selected partial image. The position of each circle is randomly selectable from the portion where the target object is present. According to the example illustrated in FIG. 13, three regions 1301 to 1303 are selected. For example, the CPU 202 extracts a partial image having a size of 50 pixels*50 pixels in such a way as to include the central circle as illustrated in FIG. 13. The CPU 202 extracts three partial images in total in FIG. 13. However, the number of the partial images (central circles) is randomly selectable. In general, the CPU 202 extracts M partial images as described in the third exemplary embodiment.

In the N*M partial image assembly having been selected in the above-described manner, the target object is constantly present at each central position. Therefore, in the present exemplary embodiment, the CPU 202 can set a limited search range for selecting a reference point to be used in the query as understood from FIG. 14.

Figure 14:
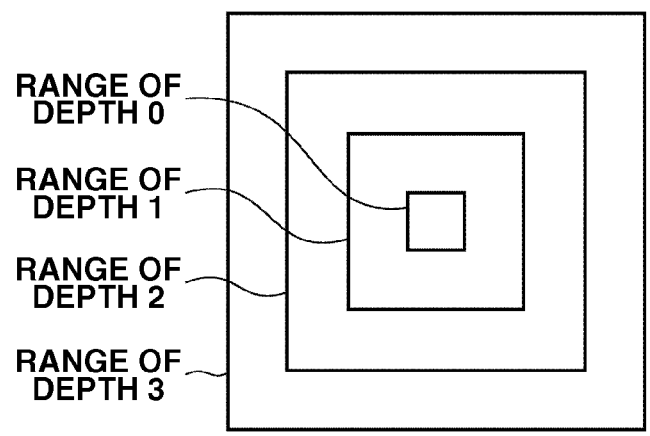
FIG. 14 illustrates a search range of a selection point at a node according to the fourth exemplary embodiment of the present invention.

The search range illustrated in FIG. 14 gradually expands according to the depth of each node, while the center of the partial image is fixed at the same point as a basic point. For example, if Z represents the length of each side of a square search range, the length Z can be defined as a function of the depth d as understood from the example illustrated in FIG. 14. The numerical value d represents the depth of each node. According to the example illustrated in FIG. 6, the range of depth 0 corresponds to the node 601 and the range of depth 1 corresponds to the nodes 602 and 607. Further, the range of depth 2 corresponds to the nodes 603, 604, 608, and 609 and the range of depth 3 corresponds to the nodes 605 and 606. According to the example illustrated in FIG. 6, the length of each side of the search range is a linear function relating to the node. However, any other monotonic increasing function can be used. Further, in the case of the node of depth 0, namely the route node, the target object is constantly present within a narrow range near the center of a partial image. Therefore, it is desired that the value of Z is small when d=0.

Setting a predetermined limited range as the search range for selecting a reference point to be used in the query, as described above, is effective to reduce the time required to generate a classification tree. Further, it is feasible to generate a very high performance classification tree by additionally employing the processing for selecting the center of a partial image from a region where the target object is present.

In the present exemplary embodiment, the method for selecting the center of a partial image from a region where the target object is present and enlarging the search range stepwise is described. In this case, the CPU 202 can execute query reference point selection algorithm using a mask according to the first exemplary embodiment in the limited search range. Further, it may be feasible to select a query reference point without using any mask at a probability comparable to the search range. Furthermore, it is useful to select, as a query reference point, an optimum point with respect to the classification tree generation efficiency from the search range.

Next, a fifth exemplary embodiment is described below. Each learning image used in the above-described first to fourth exemplary embodiments is a two-dimensional image of a captured target object. The mask image includes a high luminance portion as an area where the target object is present. On the other hand, a distance image expressing depth information of the target object and a reliability level image expressing its reliability level are used in the fifth exemplary embodiment.

Figure 15A:
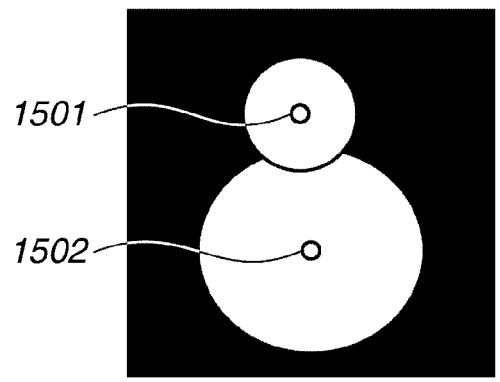
FIGS. 15A to 15C illustrate learning samples according to a fifth exemplary embodiment of the present invention.
Figure 15B:
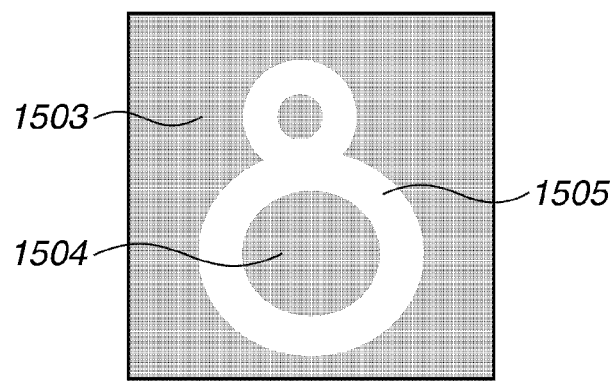
Figure 15C:
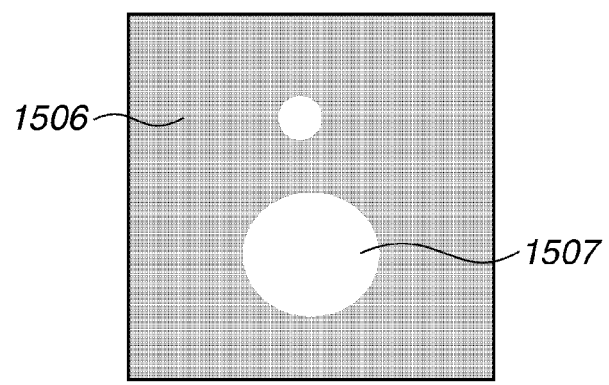

FIG. 15A illustrates an example distance image of the target object. FIGS. 15B and 15C illustrate examples of the reliability level image. For example, as a method for generating an image expressing the depth information (i.e., the position in the Z-axis direction) of an object, it is desired to express a near side as a higher luminance portion. In the present exemplary embodiment, the Z axis is one of three axes that form a three-dimensional space, and is parallel to a visual axis direction. If the portion other than the target object is infinity, its distance image as illustrated in FIG. 15A includes a portion of zero that represents the portion other than the target object. FIG. 15A illustrates two semi-spheres cooperatively constituting a snowman-like shape. The centers 1501 and 1502 of respective semi-spheres are highest in luminance. The gradational regions are concentrically formed around respective centers 1501 and 1502. As described above, the distance image is an image obtainable, for example, by performing scale conversion for converting distance values ranging from a certain value to another value into corresponding values in a range from 0 to 255.

FIG. 15B illustrates a reliability level image obtainable when the distance measurement is performed according to a stereo method. If the target object does not have any texture as illustrated in FIG. 15A, it is difficult to detect corresponding points from the surface of the object according to the stereo method. As a result, the reliability level of a central area 1504 of the object becomes lower. On the other hand, it is easy to search for corresponding points in a peripheral area 1505 where a jump edge or an occluding edge is present. The reliability of the expressed distance becomes higher.

As described above, an area 1503 where the target object is not present can be regarded as infinity whose reliability level is low. In a case where the target object is a perfect sphere, a position of a jump edge or an occluding edge is variable in the visual axis direction. As a result, if the target object is a perfect sphere, the distance reliability level of the peripheral area 1505 of the object becomes lower. However, the example illustrated in FIG. 15A is a semi-sphere. Therefore, a three-dimensional sharpened edge of the object is present in a peripheral area of the object.

On the other hand, FIG. 15C illustrates a reliability level image obtainable when the distance measurement is performed according to a spatial coding method or a method using a laser distance meter. The stereo method is excellent in that the reliability level of a peripheral edge region of the target object is high. On the other hand, the spatial coding method is excellent in that the reliability level of a central area 1507 of the object becomes higher because the distance measurement can be surely performed at a portion having a higher flatness.

As described above, the distribution of reliability level is generally variable depending on the type of an employed distance measurement method. However, when the same distance measurement method is employed in the learning process and in the recognition process, a similar reliability level distribution can be obtained. According to the above-described example, in the learning process, the distance image (FIG. 15A) and the reliability level image (FIG. 15B or FIG. 15C) are obtained by actually measuring the distance of the target object.

On the other hand, the distance image illustrated in FIG. 15A is replaceable by a distance image calculated based on a computer-aided design (CAD) model. In this case, it is required to generate a reliability level image corresponding to FIG. 15B or 15C based on the CAD model. If the stereo method described with reference to FIG. 15B is employed, an image is generated in such a manner that the reliability level becomes higher when the distance from a jump edge or an occluding edge is short. On the other hand, the spatial coding method or the method using the laser distance meter described with reference to FIG. 15C may be employed. In this case, the direction normal to an object surface is calculated and an image is generated in such a manner that the reliability level becomes higher when the angle between the calculated normal direction and the visual axis direction is small. In any case, the method to be employed is similar to the distance measurement method employed in the recognition process.

A flowchart illustrating the learning process according to the fifth exemplary embodiment is basically similar to the flowchart illustrating the learning process according to the first exemplary embodiment described with reference to FIGS. 1A and 1B. However, according to the flowchart according to the fifth exemplary embodiment, in step S101, the CPU 202 "stores all learning patterns and reliability level patterns in the route node," instead of "storing all learning patterns and mask patterns in the route node" as described in the first exemplary embodiment. Further, in the present exemplary embodiment, a subroutine to "expand the node (current node)" called in step S109 is different from that in the first exemplary embodiment as illustrated in FIG. 16.

Figure 16:
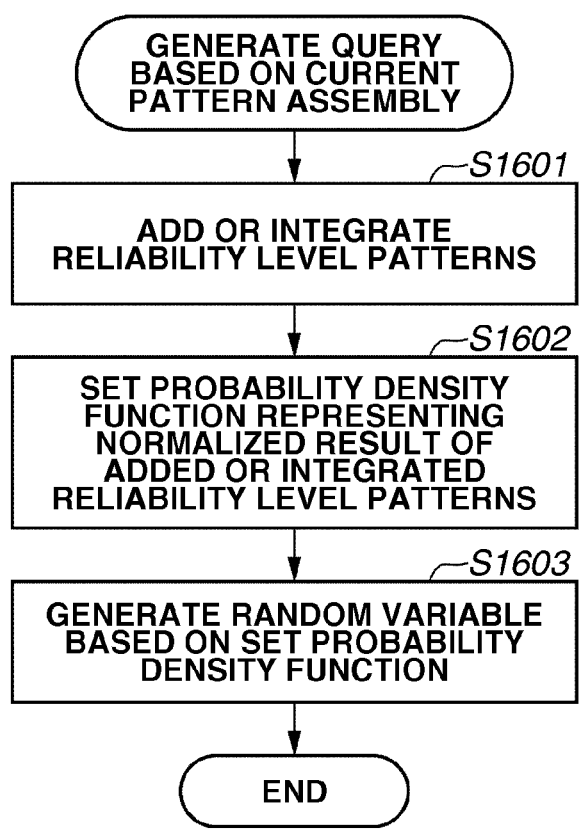
FIG. 16 is a flowchart illustrating an example of a query generation process according to the fifth exemplary embodiment of the present invention.

The subroutine illustrated in FIG. 16 is substantially similar to the subroutine according to the first exemplary embodiment described with reference to FIG. 4, except that the "mask pattern" in steps S401 and S402 is replaced by "reliability level pattern" in steps S1601 and S1602. More specifically, in step S1601, the CPU 202 adds or integrates the reliability level patterns that are present in the current node. Then, in step S1602, the CPU 202 normalizes the added or integrated result of the reliability level patterns to generate a probability density function. Then, in step S1603, the CPU 202 generates a random variable based on the probability density function to determine a reference point to be used in the query. As a result, the CPU 202 can acquire a query reference point from a highly reliable portion by performing the processing of the flowchart illustrated in FIG. 16.

However, the CPU 202 does not use any reliability level pattern or reliability level image in the recognition process. Therefore, processing to be performed by the CPU 202 in the recognition process is similar to that described in the first to fourth exemplary embodiments. More specifically, in the fifth exemplary embodiment, the CPU 202 performs recognition processing according to the flowchart illustrated in FIG. 7. Further, in a case where the CPU 202 learns a plurality of trees as described in the second exemplary embodiment, the fifth exemplary embodiment can be realized by replacing the mask pattern and the mask image by the reliability level pattern and the reliability level image, respectively.

Further, in a case where the CPU 202 learns a plurality of subimages as described in the third and fourth exemplary embodiments, the fifth exemplary embodiment can be realized by replacing the mask pattern and the mask image by the reliability level pattern and the reliability level image, respectively. More specifically, instead of extracting partial patterns and partial images from a mask pattern and a mask image, the CPU 202 extracts partial patterns and partial images from a reliability level pattern and a reliability level image.

Next, a sixth exemplary embodiment of the present invention is described below. In the above-described first to fourth exemplary embodiments, N combinations of learning patterns and mask patterns or M*N combinations of partial learning patterns and partial mask patterns are used as learning data. Further, in the fifth exemplary embodiment, N combinations of distance patterns and reliability level patterns or M*N combinations of partial distance patterns and partial reliability level patterns are used as learning data.

On the other hand, in the sixth exemplary embodiment, the CPU 202 processes N combinations of learning patterns, corresponding mask patterns, distance patterns, and corresponding reliability level patterns as learning data. Further, the CPU 202 processes M*N combinations of partial learning patterns, corresponding partial mask patterns, partial distance patterns, and corresponding partial reliability level patterns.

Figure 17A:
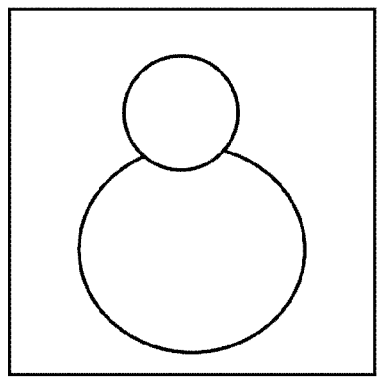
FIGS. 17A to 17D illustrate learning samples according to a sixth exemplary embodiment of the present invention.
Figure 17B:
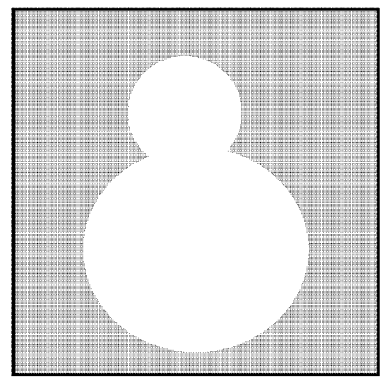
Figure 17C:
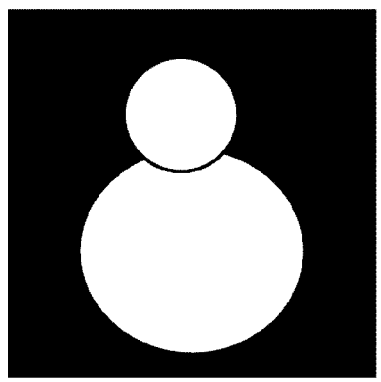
Figure 17D:
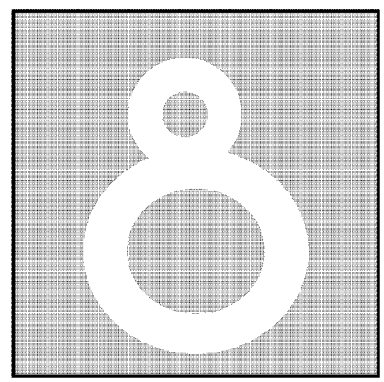

FIGS. 17A to 17D illustrate an example set of learning data (i.e., data to be used in the learning process). FIG. 17A illustrates an example of the learning pattern or learning image. FIG. 17B illustrates an example of the corresponding mask pattern or mask image. In addition, FIG. 17C illustrates an example of the distance pattern or distance image. FIG. 17D illustrates an example of the corresponding reliability level pattern or reliability level image. The learning pattern and the mask pattern illustrated in FIGS. 17A and 17B are similar to those illustrated in FIGS. 3A and 3B, respectively. The distance pattern and the reliability level pattern illustrated in FIGS. 17C and 17D are similar to those illustrated in FIGS. 15A and 15B, respectively. In short, in the sixth exemplary embodiment, the CPU 202 processes two types of learning data. These two types of learning data are referred to as "two channels" in the following description.

The mask pattern (or mask image) illustrated in FIG. 17B is a pattern (or image) having a higher value at an area where the target object is present and a lower value at an area where the target object is not present. In other words, the mask pattern (or mask image) illustrated in FIG. 17B can be regarded as a reliability level pattern (or reliability level image) with respect to the presence of the target object. Therefore, in the following description, the mask pattern (or mask image) is regarded as a kind of the reliability level pattern (or reliability level image).

Figure 18A:
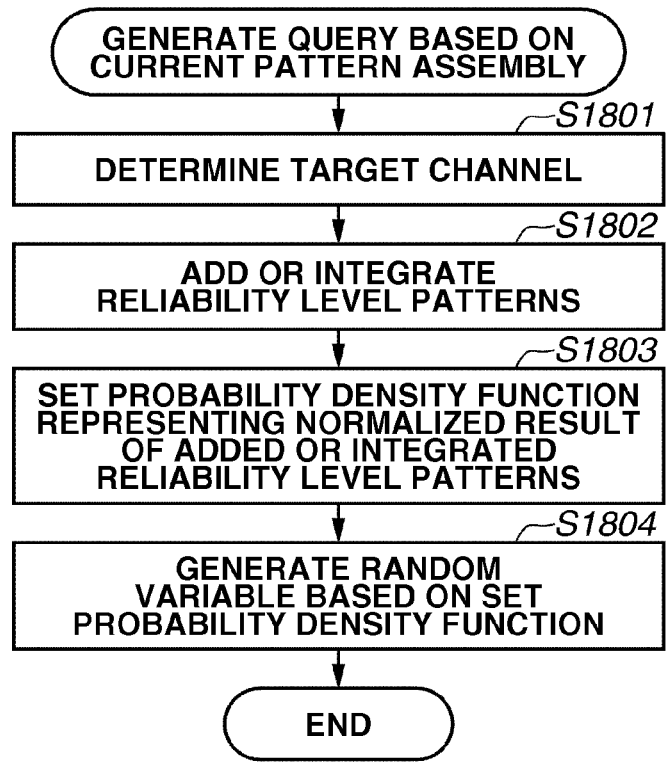
FIGS. 18A and 18B are flowcharts illustrating an example of the query generation process according to the sixth exemplary embodiment of the present invention.
Figure 18B:
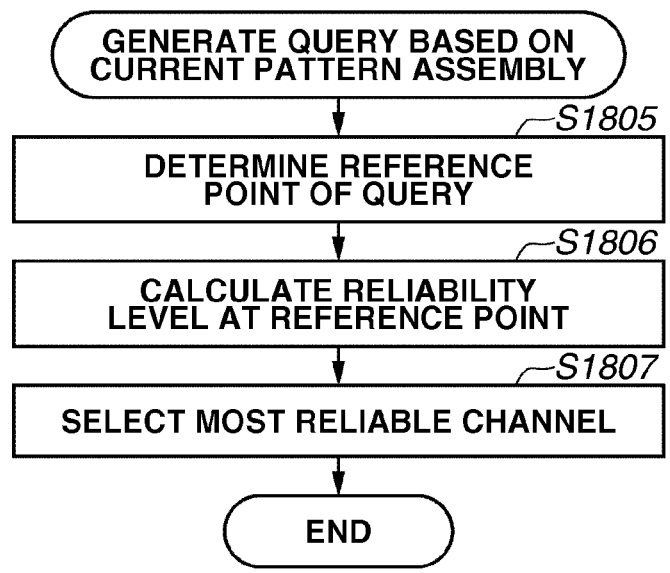

In the sixth exemplary embodiment, when the CPU 202 generates a tree structured dictionary in the learning process, the CPU 202 selects the channel to be used between the example illustrated in FIGS. 17A and 17B and the example illustrated in FIGS. 17C and 17D at each node in the learning process. FIGS. 18A and 18B are two flowcharts illustrating example processing that can be performed by the CPU 202 in the present exemplary embodiment. The flowchart illustrated in FIG. 18A includes steps S1801 to S1804 according to one exemplary embodiment. The flowchart illustrated in FIG. 18B includes steps S1805 to S1807 according to another exemplary embodiment.

In the flowchart illustrated in FIG. 18A, first in step S1801, the CPU 202 determines a target channel. More specifically, the CPU 202 determines the channel to be used between the example illustrated in FIGS. 17A and 17B and the example illustrated in FIGS. 17C and 17D. Next, the CPU 202 performs processing in steps S1802 to 1804 on the selected channel. The processing to be performed in steps S1802 to 1804 is substantially similar to the processing in step S1601 to step S1603 illustrated in FIG. 16.

In the example processing illustrated in FIG. 18B, first in step S1805, the CPU 202 determines a reference point of the query prior to the determination of the channel to be used. To this end, for example, the CPU 202 randomly selects two points from a predetermined area as described in the fourth exemplary embodiment. Next, in step S1806, the CPU 202 calculates a sum of reliability levels at the selected reference points. Finally, in step S1807, the CPU 202 selects a reliable channel that has a highest reliability level at the reference point determined in step S1805.

Alternatively, in step S1806, the CPU 202 can calculate a product of reliability levels at the selected reference points instead of obtaining the above-described sum. In general, the CPU 202 calculates an increasing function relating to the reliability level at the reference point and, in step S1807, selects a reliable channel that has a highest value.

In the recognition process according to the sixth exemplary embodiment, the CPU 202 processes two types of patterns (or images) illustrated in FIG. 17A and FIG. 17C as input data and determines the channel to be used with reference to channel information stored at each node of a tree structure in the learning process.

The number of the channels used in the present exemplary embodiment is not limited to two. For example, three or more types of (modal) data can be used. For example, the CPU 202 can perform learning and recognition processing using three types of data, such as, a luminance image, a distance image, and a surface temperature image. Further, the CPU 202 can perform two types of image processing on a captured image beforehand and perform learning and recognition processing using a distance image and two types of preprocessed image data obtained in the above-described preliminary processing.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-064756 filed Mar. 19, 2010, which is hereby incorporated by reference herein in its entirety.

What is claimed is:

1. A method for generating a dictionary being used for recognizing a target object by classifying a plurality of learning patterns the method comprising:

obtaining a plurality of learning patterns including a target object, wherein each learning pattern has a same number of pixels;

generating a plurality of mask patterns which respectively indicates a region where the target object exists in each learning pattern;

calculating probability that a pixel at a same position in each learning pattern is included in the region where the target object exists by referring to the plurality of mask patterns;

selecting at least one pixel having relatively higher probability based on the calculated probability; and classifying each learning pattern based on the at least one selected pixel.

2. The method according to claim 1, further comprising replacing learning pattern data when the selected pixel does not belong to the target object to be recognized by another value.

3. The method according to claim 1, wherein the learning pattern is a partial image obtained by dividing an image.

4. The method according to claim 3, wherein, in the selecting, a pixel corresponding to a central position of the partial image is randomly selected based on the region where the target object exists.

5. The method according to claim 1, wherein the mask pattern has a value continuously variable in a predetermined range.

6. The method according to claim 1, wherein the mask pattern can be generated by expanding the area where the target object exists.

7. The method according to claim 1, wherein the selection of the point to be referred to is performed based on a generation efficiency of the dictionary.

8. The method according to claim 1, wherein a pixel value where the target object exists in the mask pattern is a positive number and a pixel value where the target object does not exist is zero, and wherein the pixel value in the mask pattern is a positive number, and the probability that a pixel at a same position in each learning pattern is included in the region where the target object exists is obtained by adding each pixel value of the same position in each mask pattern.

9. The method according to claim 1, wherein a pixel value where the target object exists in the mask pattern is a positive number and a pixel value where the target object does not exist is zero, and wherein the probability that a pixel at a same position in each learning pattern is included in the region where the target object exists is obtained by integrating each pixel value of the same position in each mask pattern.

10. The method according to claim 1, wherein the learning pattern is a range image.

11. The method according to claim 10, wherein the range image is generated by a CAD model.

12. An information processing apparatus for generating a dictionary being used for recognizing a target object by classifying a plurality of learning patterns, the information processing apparatus comprising:

an obtaining unit configured to obtain a plurality of learning patterns including a target object, wherein each learning pattern has a same number of pixels;

a generating unit configured to generate a plurality of mask patterns which respectively indicates a region where the target object exists in each learning pattern;

a calculating unit configured to calculate probability that a pixel at a same position in each learning pattern is included in the region where the target object exists by referring to the plurality of mask patterns;

a selecting unit configured to select at least one pixel having relatively higher probability based on the calculated probability; and a classifying unit configured to classify each learning pattern based on the at least one selected pixel.

13. A non-transitory computer readable storage medium storing a program that causes a computer to execute a method according to claim 1.

14. A method for generating a tree-structured dictionary having a plurality of layers and being used for recognizing a target object by classifying a plurality of learning patterns, the method comprising:

obtaining a plurality of learning patterns including a target object, wherein each learning pattern has the same number of pixels;

generating a plurality of mask patterns which respectively indicates a region where the target object exists in each learning pattern;

selecting a pixel from an area where the target object to be recognized exists, in each learning pattern by referring to each mask pattern;

extracting a plurality of partial learning images including the selected pixel being in the vicinity of a center position thereof from each learning pattern;

setting a search range based on a number of current layers of the tree-structured dictionary;

selecting at least one pixel from the search range; and classifying the plurality of partial learning images based on the at least one pixel selected from the search range.

15. The method according to claim 14, wherein in the selecting step, the search range for selecting the pixel is changed according to the number of layers.

16. The method according to claim 14, wherein in the selecting step, the search range for selecting the pixel is enlarged as the number of layers is increased, and the pixel is selected from the enlarged search range.

17. An information processing apparatus that generates a tree structured dictionary having a plurality of layers and being used for recognizing a target object by classifying a plurality of learning patterns, the information processing apparatus comprising:

an obtaining unit configured to obtain a plurality of learning patterns including a target object, wherein each learning pattern has a same number of pixels;

a generating unit configured to generate a plurality of mask patterns which respectively indicates a region where the target object exists in each learning pattern;

a selecting unit configured to select a pixel from an area where the target object to be recognized exists, in each learning pattern by referring to each mask pattern;

an extracting unit configured to extract a plurality of partial learning images including the selected pixel being in a vicinity of a center position thereof from each learning pattern;

a setting unit configured to set a search range based on a number of current layers of the tree-structured dictionary;

a selecting unit configured to select at least one pixel from the search range; and a classifying unit configured to classify each learning pattern based on the at least one pixel selected from the search range.

18. The method according to claim 14, wherein in the classifying, the plurality of partial learning images is classified by comparing a pixel value of the pixel selected by referring to the mask pattern with a pixel value of the pixel selected from the search range.

19. The method according to claim 14, wherein in the extracting, the plurality of partial learning images including the selected pixel being in the center position thereof is extracted.

20. The method according to claim 14, wherein the learning pattern is a range image.

21. The method according to claim 20, wherein the range image is generated by a CAD model.

* * * * *